United States Patent
Endres et al.

(10) Patent No.: US 8,328,429 B2
(45) Date of Patent: Dec. 11, 2012

(54) RADIAL ANTI-FRICTION BEARING, PARTICULARLY CYLINDER ROLLER BEARING FOR THE SUPPORT OF SHAFTS IN WIND POWER GEARBOXES

(75) Inventors: Bernd Endres, Roethlein (DE); Christian Hoffinger, Georgensgmuend (DE); Tobias Mueller, Dipperz (DE); Witold Marek Smolenski, Schweinfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 694 days.

(21) Appl. No.: 12/529,572

(22) PCT Filed: Feb. 26, 2008

(86) PCT No.: PCT/DE2008/000339
§ 371 (c)(1),
(2), (4) Date: Oct. 7, 2009

(87) PCT Pub. No.: WO2008/106933
PCT Pub. Date: Sep. 12, 2008

(65) Prior Publication Data
US 2010/0061675 A1 Mar. 11, 2010

(30) Foreign Application Priority Data
Mar. 3, 2007 (DE) .......................... 10 2007 010 348

(51) Int. Cl.
*F16C 33/34* (2006.01)
*F16C 43/04* (2006.01)

(52) U.S. Cl. ........................................ 384/567; 384/584

(58) Field of Classification Search .................. 384/565, 384/567, 584
See application file for complete search history.

(56) References Cited

U.S. PATENT DOCUMENTS

| 4,133,587 A | 1/1979 | Kume |
| 7,032,704 B2 * | 4/2006 | Zernickel et al. ............. 180/444 |

FOREIGN PATENT DOCUMENTS

| DE | 12 61 709 A | 2/1968 |
| DE | 27 41 057 A | 3/1979 |
| DE | 197 34 980 A | 2/1999 |
| FR | 2 479 369 A | 10/1981 |
| JP | 03 277809 A | 12/1991 |
| SU | 752 065 A | 7/1980 |

* cited by examiner

*Primary Examiner* — Phillip A Johnson
(74) *Attorney, Agent, or Firm* — Lucas & Mercanti, LLP; Klaus P. Stoffel

(57) ABSTRACT

A radial anti-friction bearing, which has an outer and inner bearing race with an inner and outer raceway and cylinder rollers that roll on the raceways between the bearing races and which are held at equal distances to each other in the peripheral direction by a bearing cage. To prevent slip, the cylinder rollers are replaced by hollow rollers, which have a larger outside diameter and lower modulus of elasticity. The dimensions of the bearing races, cylinder rollers and hollow rollers are configured such that both the cylinder and hollow rollers initially have a defined radial bearing clearance in the non-installed state of the radial anti-friction bearing, and the pretension necessary for the continuous drive of the bearing cage is adjusted on the hollow rollers only once the radial anti-friction bearing has been installed, while simultaneously reducing the radial bearing clearance at the cylinder rollers.

3 Claims, 2 Drawing Sheets

US 8,328,429 B2

RADIAL ANTI-FRICTION BEARING, PARTICULARLY CYLINDER ROLLER BEARING FOR THE SUPPORT OF SHAFTS IN WIND POWER GEARBOXES

This application is a 371 of PCT/DE2008/000339 filed Feb. 26, 2008, which in turn claims the priority of DE 10 2007 010 348.6 filed Mar. 3, 2007, the priority of both applications is hereby claimed and both applications are incorporated by reference herein.

FIELD OF THE INVENTION

The invention relates to a radial rolling bearing and can be implemented particularly advantageously on bearings which run at a very low load at least at times, for example cylinder roller bearings for mounting shafts in wind power transmissions.

BACKGROUND TO THE INVENTION

A person skilled in the art of rolling bearing technology will in general be aware that radial rolling bearings have an optimum kinematic operating state when sufficiently loaded, at which the rolling bodies roll on the raceways of the inner and of the outer bearing ring without sliding. Furthermore, in the case of radial rolling bearings which are operated on low loads at least at times, it is known that the rolling body set which comprises the rolling bodies and their bearing cage does not rotate at the kinematic rotation speed because of the friction in the bearing and because of the high mass force of the rolling body set and the contact force, which is small at times, between the rolling bodies and the raceways. In consequence, the rotation speed of the rolling body set is less than the kinematic rotation speed, as a result of which the rolling bodies are in a kinematically non-optimum state, as a result of which slip occurs between these rolling bodies and at least one raceway. In this case, a lubricating film can form on the contact surfaces between the rolling bodies and the raceway. However, the lubricating film is destroyed in the event of a sudden change in the rotation speed or load, as a result of which there is no longer an adequate lubricating film at the contact points where the slip occurs within a very short time. This results in a metallic contact between the raceway and the rolling bodies, which slide on the raceway until the rolling bodies are accelerated to the kinematic rotation speed. This large speed difference between the raceway and the rolling bodies, as well as the lack of a separating lubricating film therefore results in high tangential stresses in the surfaces of the raceway and of the rolling bodies, which are associated with very severe wear phenomena, such as roughening of the raceways, material being torn off and rubbing marks, generally in conjunction with micropitting, thus leading to premature failure of the radial rolling bearing.

A radial rolling bearing of this generic type has therefore been proposed in FR 2 479 369, which essentially comprises an outer bearing ring with an inner raceway and an inner bearing ring which is arranged coaxially with respect thereto and has an outer raceway, and also a multiplicity of cylinder rollers which roll between the bearing rings on their raceways and are held at uniform distances from one another in the circumferential direction by a bearing cage, in which a plurality of cylinder rollers which are distributed uniformly on the circumference are replaced by hollow rollers in order to avoid the described slip effect between the cylinder rollers and the bearing rings and the disadvantages which result from this. These hollow rollers, which are also axially somewhat shorter than the cylinder rollers, have a slightly larger diameter and a lower modulus of elasticity than the cylinder rollers, as a result of which, in the load-free state of the radial rolling bearing, they make continuous contact with the bearing rings and therefore ensure a continuous drive of the bearing cage and thus of the cylinder rollers at the kinematic rotation speed.

However, it has proven to be a disadvantage of radial rolling bearings which are designed in this way that the hollow rollers which are formed with a slightly larger diameter than the cylinder rollers make the assembly and disassembly of a bearing of said type considerably more difficult, or possible only with additional expenditure. This lies in the fact that the co-rotating, usually inner bearing ring of the bearing must have an outer diameter which corresponds to the distance between in each case two opposite cylinder rollers in order that, firstly, the bearing load is absorbed only by the cylinder rollers and, secondly, the hollow rollers, which are slightly larger in diameter, are provided with the preload required for the continuous drive of the bearing cage. Since the outer radius of the inner bearing ring is therefore slightly larger than the distance between the bearing longitudinal axis and the outer diameter of the hollow rollers, an assembly of the inner bearing ring as sought by the manufacturer is possible only by means of additional thermal treatment, in which the outer bearing ring is heated together with the rolling body set until the thermal expansion of the outer bearing ring, which is generated in this way, is sufficient to axially insert the inner bearing ring into the bearing. Even though, in order to avoid such an elevated level of expenditure for the manufacturer, it would be possible for the outer bearing ring with the rolling body set and for the inner bearing ring of the radial rolling bearing to be supplied as a separate assembly set, this would result in the installation of the radial rolling bearing, for example for mounting shafts in wind power transmissions, being made more complex by first placing the loose inner bearing ring onto the shaft with an interference fit, and the outer bearing ring with the rolling body set being inserted into a bore in the housing with an interference fit. The housing, together with the outer bearing ring and the rolling body set, must then be heated until the shaft with the inner bearing ring can be inserted axially into the bearing, with the preload on the hollow rollers required for the continuous drive of the bearing cage being generated as the housing and the outer bearing ring cool down. However, such a method has proven to be too complex and expensive in practice, and therefore does not meet the requirements, in the form of easy manageability and compact design, for modern slip-free radial rolling bearings.

OBJECT OF THE INVENTION

Against the background of the described disadvantages of the known prior art, the invention is therefore based on the object of designing a radial rolling bearing, in particular cylinder roller bearing for mounting shafts in wind power transmissions, which is formed with a plurality of hollow rollers for preventing slip between the cylinder rollers and the bearing rings and which is characterized by easy manageability, particularly during its assembly, and by means of a compact design.

DESCRIPTION OF THE INVENTION

According to the invention, in the case of a radial rolling bearing, this object is achieved in such a way that the dimensions of the bearing rings and also of the cylinder rollers and of the hollow rollers are configured such that, in the uninstalled state of the assembled radial rolling bearing, both the cylinder rollers and the hollow rollers, which are formed with a larger outer diameter than the cylinder rollers, have initially a defined radial bearing play, and the preload on the hollow rollers, with the simultaneous minimization of the radial bearing play at the cylinder rollers required for the continuous drive of the bearing cage, cannot be set until the radial rolling bearing is installed.

The invention is therefore based on the realization that, by forming all the parts of the radial rolling bearing with dimensions such that even the hollow rollers, which are greater in diameter than the cylinder rollers, have a defined radial bearing play, it is easily possible firstly for the outer bearing ring with the rolling body set and for the inner bearing ring of the radial rolling bearing to no longer be supplied separately but rather to be supplied in pre-assembled form, and secondly for the radial rolling bearing to be installed on location as a complete modular unit, and for the final radial bearing play for all parts to be set during such installation.

It is accordingly provided in the radial rolling bearing designed according to the invention that the outer diameter of the hollow rollers has an oversize with respect to the outer diameter of the cylinder rollers, which oversize is less than half of the radial bearing play of the cylinder rollers in the uninstalled state of the radial rolling bearing. For example, if the outer diameter of the hollow rollers is formed with an oversize of approximately 60 μm with respect to the outer diameter of the cylinder rollers, the total radial bearing play must be dimensioned to be approximately 130 μm in order that a radial bearing play of approximately 10 μm remains at the hollow rollers with respect to the outer diameter of the inner bearing ring. In this way, it is ensured that the loose, usually inner bearing ring can, as is the case in a conventional radial rolling bearing without hollow rollers, be inserted axially into the bearing, and supplied as a preassembled modular unit, without any further measures such as heating of the fixed, usually outer bearing ring, or else cooling of the inner bearing ring.

Finally, it is a further feature of the radial rolling bearing designed according to the invention that the required preload of the hollow rollers and also the minimized radial bearing play of the cylinder rollers are set preferably by means of a fit-induced expansion or contraction of at least one of the two bearing rings. This is to be understood to mean that the radial rolling bearing designed according to the invention without a preload, now offers several advantageous options for assembly on a shaft bearing arrangement, such as in a transmission of wind power plants, in each case on the basis of corresponding fits in the bores of the housing of the shaft bearing arrangement or of the inner bearing ring.

Here, a first preferred assembly option consists in the housing of the shaft bearing arrangement being of split design, similarly to the crankshaft bearing arrangement of an internal combustion engine, and in the entire radial rolling bearing being at first assembled on the corresponding shaft by means of an interference fit between the inner bearing ring and said corresponding shaft, such that the greater part of the preload required for the continuous drive of the bearing cage, is already generated in this way. The bearing assembled this way is then placed together with the shaft into a first housing half of the shaft bearing arrangement, such that the second housing half can subsequently be placed onto the first housing half, and braced with the latter, so as to surround the bearing. The bore in the housing, which holds the bearing, is dimensioned here such that, when the two housing halves are braced, the outer bearing ring is contracted in such a way that the rest of the preload on the hollow rollers of the bearing required for the continuous drive of the bearing cage is set, while simultaneously minimizing the radial bearing play at the cylinder rollers.

In contrast, in a second, likewise highly advantageous assembly option, a single-part housing is provided for the shaft bearing arrangement, the holding bore of which housing for the radial rolling bearing is however likewise dimensioned so as to be slightly smaller than the outer diameter of the outer bearing ring. Here, too, the entire radial rolling bearing is at first assembled on the corresponding shaft by means of an interference fit between the inner bearing ring and said corresponding shaft, and is subsequently inserted together with the shaft into the housing. However, since the holding bore in the housing is smaller than the outer diameter of the outer bearing ring, either the housing is briefly locally heated at the holding bore until the shaft with the radial rolling bearing can be inserted into the bore as a result of the thermally induced expansion of the bore, or the shaft together with the bearing is cooled, likewise until the shaft with the radial rolling bearing can be inserted into the bore. By means of the subsequent cooling of the housing bore or heating of the shaft with the bearing, the outer bearing ring is then contracted again, or the inner ring expanded again, in such a way that the preload on the hollow rollers of the bearing required for the continuous drive of the bearing cage is set, while simultaneously minimizing the radial bearing play at the cylinder rollers.

A third assembly option, as an alternative to the assembly options mentioned above, is finally for the entire radial rolling bearing at first to be assembled in a likewise single-part housing by means of an interference fit between the outer bearing ring and the bore of said housing, and for only the shaft which is to be inserted to be cooled until it can be inserted axially into the inner bearing ring. The subsequent heating of the shaft then causes the inner bearing ring to expand until the preload on the hollow rollers of the bearing required for the continuous drive of the bearing cage is set again, while simultaneously minimizing the radial bearing play at the cylinder rollers.

In summary, the radial rolling bearing which is designed according to the invention therefore has the advantage over radial rolling bearings known from the prior art, which have a plurality of hollow rollers arranged between the cylinder rollers and the bearing rings, that, as a result of the individual parts of said radial rolling bearing being formed with dimensions such that, in the uninstalled state, even the hollow rollers, which are designed to be greater in diameter than the cylinder rollers, have a defined radial bearing play, said radial rolling bearing can be pre-assembled by the manufacturer and is therefore distinguished by a compact design and by facilitated manageability in particular when being assembled on and disassembled from a shaft bearing arrangement, such as for example in a transmission of wind power plants.

BRIEF DESCRIPTION OF THE DRAWINGS

One preferred embodiment of the radial rolling bearing designed according to the invention is explained in more detail in the following text with reference to the attached drawings, in which.

DETAILED DESCRIPTION OF THE DRAWINGS

Figures 1, 2:
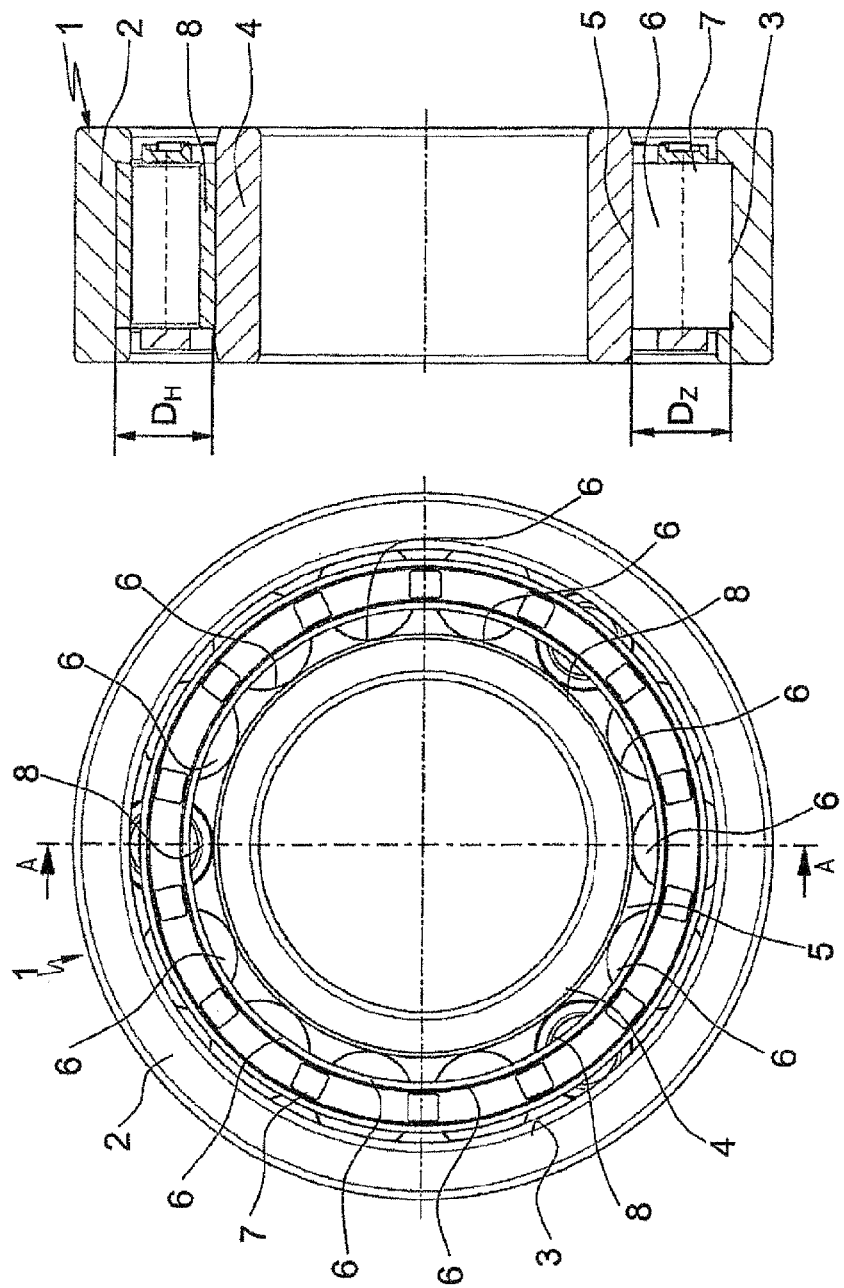
FIG. 1 shows a side view of a radial rolling bearing designed according to the invention.
FIG. 2 shows the cross section A-A through the radial rolling bearing designed according to the invention, as shown in FIG. 1.

The illustrations in FIGS. 1 and 2 clearly show a radial rolling bearing 1 which is suitable for mounting shafts in wind power transmissions and, in a known manner, comprises an outer bearing ring 2 with an inner raceway 3 and an inner bearing ring 4, which is arranged coaxially with respect thereto and has an outer raceway 5, and also a multiplicity of cylinder rollers 6 which roll between the bearing rings 2, 4 on their raceways 3, 5 and are held at uniform distances from one another in the circumferential direction by a bearing cage 7. The drawings likewise clearly show that, in the case of the illustrated radial rolling bearing 1, three rolling bodies which are distributed uniformly on the circumference are replaced by hollow rollers 8 in order to avoid slip between the cylinder rollers 6 and the bearing rings 2, 4, which hollow rollers 8 have a slightly larger diameter $D_H$ and a lower modulus of elasticity than the cylinder rollers 6. In this way, in the load-free state of the radial rolling bearing 1, the hollow rollers 8 have continuous contact with the bearing rings 2, 4 and thus ensure a continuous drive for the bearing cage 7 and thus for the cylinder rollers 6 at a kinematic rotation speed.

Figure 3A:
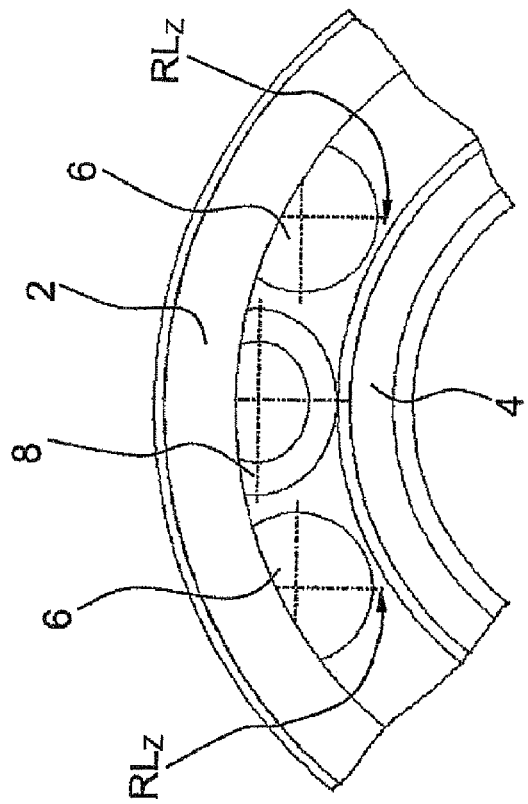
FIG. 3a shows an enlarged detail from the side view of an uninstalled radial rolling bearing according to the invention.
Figure 3B:
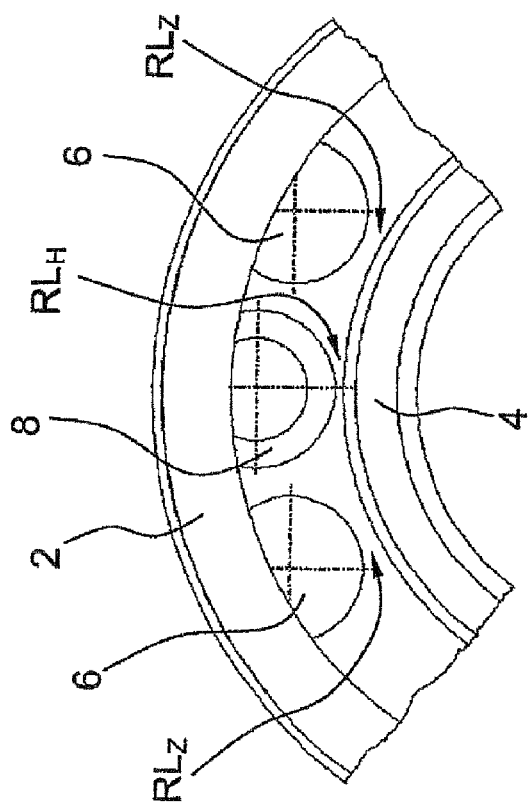
FIG. 3b shows an enlarged detail from the side view of an installed radial rolling bearing according to the invention.

It can also be seen from FIGS. 3a and 3b that, in order to facilitate the assembly of a radial rolling bearing 1 which is designed in this way, the dimensions of the bearing rings 2, 4 and of the cylinder rollers 6 and of the hollow rollers 8 are configured according to the invention such that, in the uninstalled state of the assembled radial rolling bearing 1 corresponding to the illustration according to FIG. 3a, both the cylinder rollers 6 and the hollow rollers 8, which are formed with a greater outer diameter $D_H$ than the cylinder rollers 6, initially have a defined radial bearing play $RL_Z$, $RL_H$, and are formed with the preload on the hollow rollers 8, with the simultaneous minimization of the radial bearing play $RL_Z$ at the cylinder rollers 6, required for the continuous drive of the bearing cage 7 only in the installed state of the radial rolling bearing 1 corresponding to the illustration in FIG. 3b. Here, as can be seen by way of indication from FIG. 3a, the outer diameter $D_H$ of the hollow rollers 8 has an oversize with respect to the outer diameter $D_Z$ of the cylinder rollers 6, which oversize is less than half of the radial bearing play $RL_Z$ of the cylinder rollers 6 in the uninstalled state of the radial rolling bearing 1, such that the loose inner bearing ring 4 can be inserted axially into the radial rolling bearing 1 without any further measures, as is the case with conventional radial rolling bearings. The required preload of the hollow rollers, and the minimized radial bearing play $RL_Z$ of the cylinder rollers 6 as shown in FIG. 3b, are then set by means of a fit-induced expansion or contraction of at least one of the two bearing rings 2, 4.

LIST OF REFERENCE SYMBOLS

1 Radial rolling bearing
2 Outer bearing ring
3 Inner raceway
4 Inner bearing ring
5 Outer raceway
6 Cylinder rollers
7 Bearing cage
8 Hollow rollers
$D_Z$ Outer diameter of 6
$D_H$ Outer diameter of 8
$RL_Z$ Radial bearing play of 6
$RL_H$ Radial bearing play of 8

The invention claimed is:

1. A radial rolling bearing, in particular cylinder roller bearing for mounting shafts in wind power transmissions, comprising:
    an outer bearing ring having an inner raceway;
    an inner bearing ring, which is arranged coaxially with respect to the outer bearing ring, having an outer raceway; and
    a plurality of cylinder rollers, which roll between the outer bearing ring and the inner bearing ring on the inner raceway and the outer raceway respectively, and are held at uniform distances from one another in a circumferential direction by a bearing cage, with hollow rollers arranged between the cylinder rollers in order to avoid slip between the cylinder rollers and the outer bearing ring and the inner hearing ring, the hollow rollers have a slightly larger outer diameter and a lower modulus of elasticity than the cylinder rollers, in order to, in a load-free state of the radial rolling bearing, ensure a continuous contact with the outer bearing ring and the inner bearing ring and, thus, a continuous drive for the bearing cage and for the cylinder rollers at a kinematic rotation speed,
    wherein dimensions of the outer bearing ring and the inner bearing ring, the cylinder rollers and the hollow rollers are configured such that, in an uninstalled state of an assembled radial rolling bearing, both the cylinder rollers and the hollow rollers, which are formed with the slightly larger outer diameter than the cylinder rollers, initially have a defined radial bearing play, and preload on the hollow rollers required for continuous drive of the bearing cage is not set until the radial rolling bearing, is installed while simultaneously minimizing the radial bearing play at the cylinder rollers.

2. The radial rolling bearing of claim 1, wherein the outer diameter of the hollow rollers has an oversize with respect to the outer diameter of the cylinder rollers, the oversize is less than half of the radial bearing play of the cylinder rollers in the uninstalled state of the radial rolling bearing.

3. The radial rolling bearing of claim 1, wherein the preload of the hollow rollers and the radial bearing play of the cylinder rollers are set by means of a fit-induced expansion or contraction of at least one of the outer bearing ring or the inner bearing ring.

* * * * *